United States Patent [19]

Gordon

[11] Patent Number: 5,732,916
[45] Date of Patent: Mar. 31, 1998

[54] ATTACHMENT PLATE FOR CONNECTION TO VEHICLE PANELS

[75] Inventor: Gary G. Gordon, Southfield, Mich.

[73] Assignee: TRW Inc., Cleveland, Ohio

[21] Appl. No.: 651,528

[22] Filed: May 22, 1996

[51] Int. Cl.[6] ............................................. F21V 21/00
[52] U.S. Cl. ............................ 248/220.41; 248/220.31
[58] Field of Search ...................... 248/223.41, 224.51, 248/224.61, 225.11, 225.21, 220.31, 220.21, 224.8, 316.2, 316.4; 403/326, 329, 331

[56] References Cited

U.S. PATENT DOCUMENTS

| | | |
|---|---|---|
| 1,750,605 | 3/1930 | Price . |
| 2,135,191 | 11/1938 | McBrady . |
| 2,289,225 | 7/1942 | Tonai . |
| 2,666,612 | 1/1954 | Howell . |
| 2,679,121 | 5/1954 | Hoofer . |
| 3,216,584 | 11/1965 | Sedo . |
| 3,650,502 | 3/1972 | Langhi . |
| 4,327,888 | 5/1982 | Scheneman . |
| 5,025,937 | 6/1991 | King . |
| 5,088,606 | 2/1992 | Boas .................. 248/220.31 |
| 5,357,408 | 10/1994 | Lecznar et al. . |
| 5,475,577 | 12/1995 | Vanderhoof et al. . |

*Primary Examiner*—Ramon O. Ramirez
*Assistant Examiner*—Willie Berry, Jr.
*Attorney, Agent, or Firm*—Fay, Sharpe, Beall, Fagan, Minnich & McKee

[57] ABSTRACT

A backplate assembly for attachment to a vehicle interior panel to allow connection and support of associated vehicle accessories comprises first and second backplate members positioned in side-by-side relationship with their front faces facing in the same direction. Interconnecting fingers extend between the backplate members. The fingers are operable while the backplate members are in their side-by-side position for permitting selective connected movement of the first and second backplate members between a first spaced position and a second closely adjacent position. The fingers include latch elements for releasably latching the backplate members in at least one of the first and second positions. Retaining legs extend from the rear of each of the backplate members for permitting the backplate members to be connected to a panel when in one of the first and second positions.

12 Claims, 2 Drawing Sheets

ATTACHMENT PLATE FOR CONNECTION TO VEHICLE PANELS

BACKGROUND OF THE INVENTION

The subject invention is directed to the art of mounting plates and, more particularly, to a backplate structure for use in motor vehicles.

The invention is especially suited for use in mounting overhead consoles to modular headliner panels and will be described with reference thereto; however, as will become apparent, the invention is capable of broader application and could be used for mounting many different types of vehicle accessories to various panels and support structures.

The trend toward lighter vehicles has resulted in a significant reduction in the use of metal brackets and channels welded to vehicle body panels for the support of various accessories such as overhead consoles, interior lights, and the like. Rather, it has become necessary to use backplates and support panels carried from the molded headliners and interior door panels. Typically, the systems available for attaching backplates and support panels to the semi-rigid headliners and door panels have been relatively labor-intensive and have required the use of special tools and fasteners.

SUMMARY OF THE INVENTION

The subject invention overcomes the above-discussed problems and provides a simplified backplate structure that can be quickly installed without the use of special fasteners or tools. The backplate structure of the invention can be formed from molded plastic components to install into preformed openings with a simple manual sliding movement.

In particular, and in accordance with the subject invention, a backplate assembly for attachment to a vehicle panel, such as a headliner, comprises first and second backplate members each having front and rear faces. The first and second backplate members are positioned in side-by-side relationship with their front faces facing in the same direction. Interconnecting means join the first and second backplate members and are operable while the members are in side-by-side relationship for permitting selective connected movement of the first and second backplate members from a first spaced position to a second closely adjacent position. Preferably, the interconnecting means include latch means for releasably latching the first and second backplate members in at least one of the first and second positions. Extending from the rear face of each of the first and second backplate members is at least one retaining leg which permits the backplate members to be connected to a panel when in one of the first and second positions.

In the preferred form, the retaining legs are each provided with a retaining hook. The retaining legs can then extend through correspondingly spaced openings in a vehicle panel so that when the backplate members are moved to the closely adjacent position, the retaining hooks latch behind the panel to hold the backplate members to the panel.

In the preferred form, the interconnecting means comprise relatively rigid fingers that extend from one of the backplate members and engage through guide openings in the other backplate member.

In accordance with a more limited aspect of the invention, the latch means includes a resilient latch arm that extends from one of the backplate members to the other backplate member with a detent portion that can engage in a suitable recess at the desired first and second positions of adjustment. This arrangement allows the backplate members to be pre-assembled into a relationship desirable for assembly to the vehicle panel and, after the retaining legs have been inserted through panel openings, the members can be moved toward one another to the final assembled position wherein the hook portions of the retaining legs are engaged behind the panel.

The two backplate members can be molded from plastic and can have a variety of outer configurations as well as being provided with means for permitting ready attachment of associated vehicle accessory items such as light switches and the like.

In addition to the above, it is contemplated that the preferred form of the invention can include openings that allow access to the resilient latch arm to permit movement of the detent from its latched position so that the backplate members can be moved to the spaced position wherein they can be disconnected from the panel.

As can be seen from the foregoing, the primary object of the invention is the provision of a backplate assembly which can be manually installed and removed without the use of special tools or fasteners.

A further object of the invention is the provision of a backplate assembly which can be formed from a minimum number of components by, for example, injection molding.

Yet another object of the invention is the provision of a backplate assembly of the type described which can be installed and removed by a simple sliding operation.

A still further object of the invention is the provision of an assembly of the general type described that can be formed in a variety of shapes and sizes to suit many different mounting situations.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
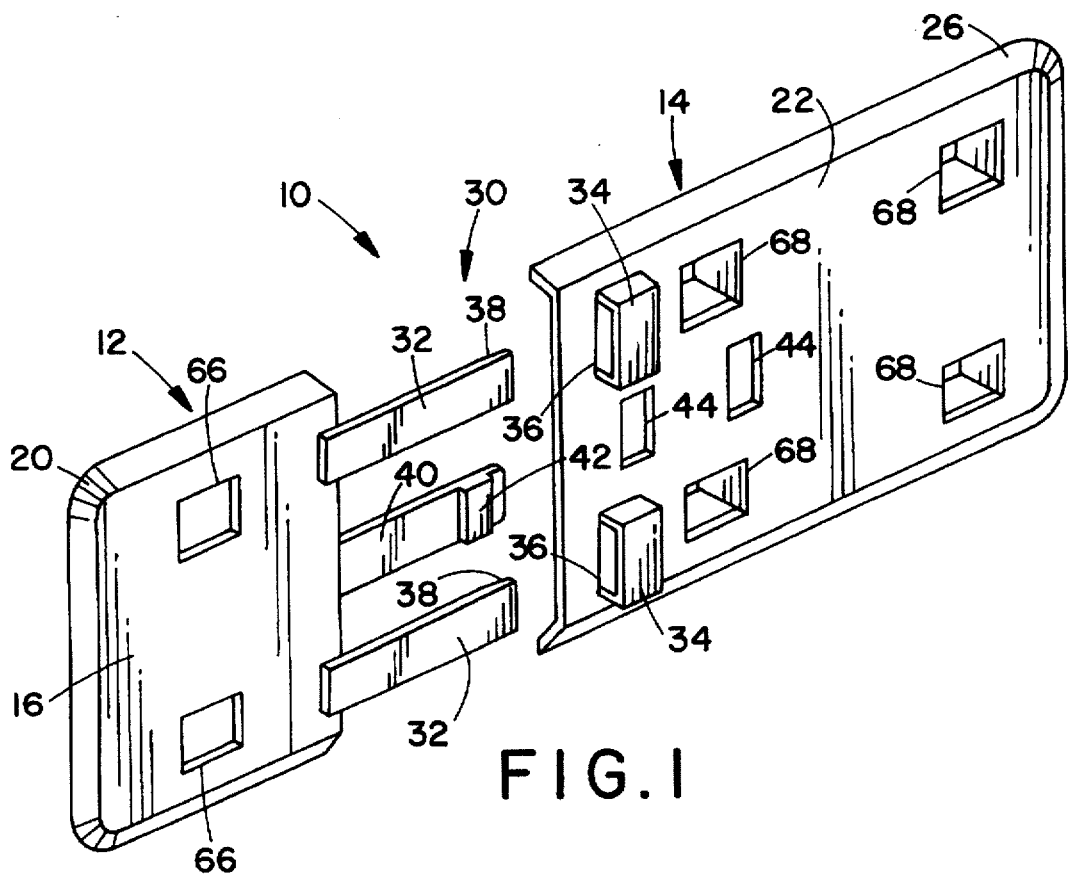
FIG. 1 is an isometric view showing the backplate assembly of the invention in a separated position.

Referring now to the drawings wherein the showings are for the purposes of illustrating the preferred embodiment of the invention only and not for purposes of limiting same, FIG. 1 shows the two main components which make up the backplate assembly of the subject invention. Generally, the assembly is comprised of first and second backplate members 12 and 14 that are preferably injection molded from plastic. The particular plastic from which they are formed forms no particular part of the invention but could be any plastic having a relatively high strength and suitable rigidity. As shown, member 12 is in the form of a relatively thin plate having a front face 16 and a rear face 18 (see FIG. 3) joined by a peripheral edge section 20 which extends about three sides including the top, the bottom, and the left end.

Figure 2:
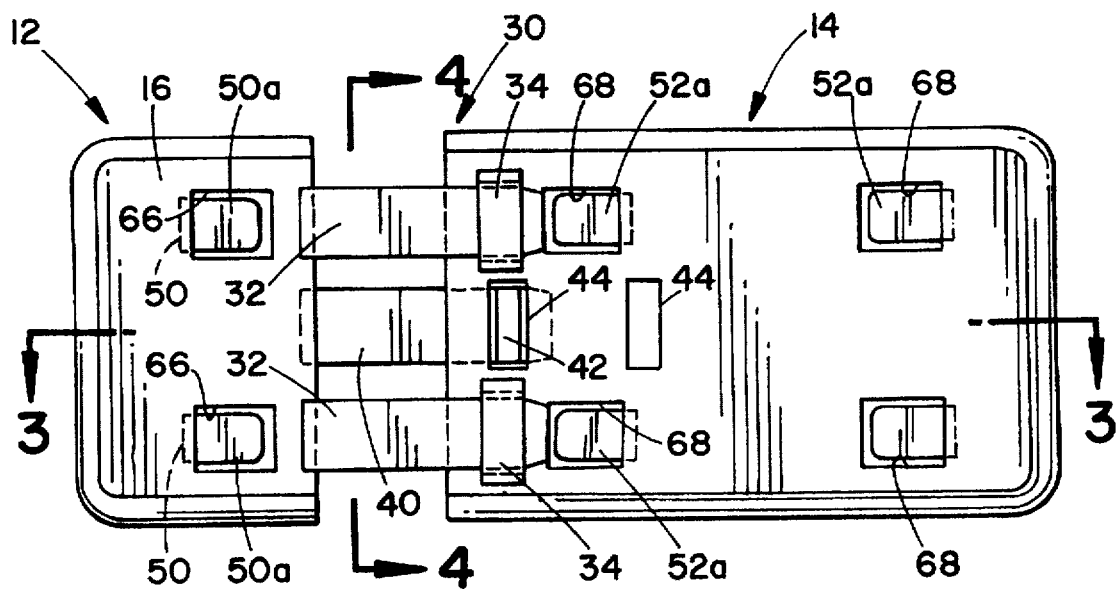
FIG. 2 is a front elevational view of the FIG. 1 elements in their assembled, pre-installation position.
Figure 3:
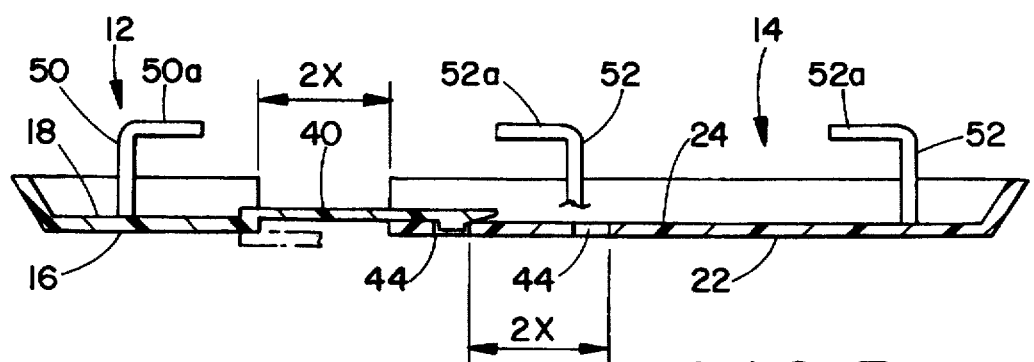
FIG. 3 is a cross-sectional view taken on line 3—3 of FIG. 2.
Figure 4:
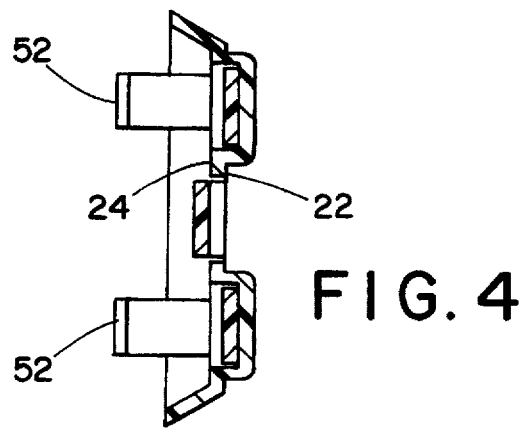
FIG. 4 is a cross-sectional view taken on line 4—4 of FIG. 2.

The member 14 is generally similar in construction and includes a front face 22 and a rear face 24 joined about the top, the bottom, and right end by a rearwardly deflected, peripheral flange portion 26. In use, the components 12 and 14 are positioned in a side-by-side relationship generally as illustrated in FIGS. 1–4. In this regard, FIG. 1 shows them in a spaced, unconnected position and FIGS. 2–4 illustrate them in their preliminary, pre-installed but interconnected position.

Figure 6:
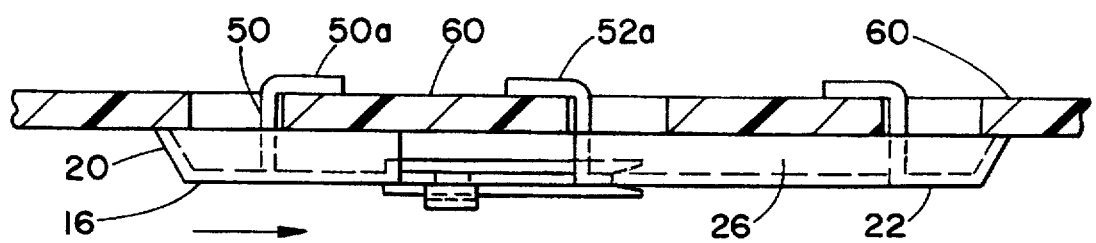

The members 12 and 14 are provided with interconnecting means indicated generally with the reference number 30. The interconnecting means 30 are arranged such that when the components are in their side-by-side relationship with their front and rear faces generally aligned and co-planar, the components are capable of being moved from a first spaced position as illustrated in FIGS. 2 and 3 to an interengaged second, closely spaced position as illustrated in FIG. 6. While the interconnecting means could take a variety of different specific structural configurations and arrangements, they are, in the preferred embodiment, comprised of elongated, relatively rigid fingers 32 that are joined at one end to the component 12 and extend in parallel laterally toward the other component 14. In the preferred embodiment, the fingers 32 are generally joined to the face surface 16 of member 12 and extend parallel therefrom.

Formed on the member 14 for receiving and cooperatively engaging the fingers 32 are guide means 34 comprising generally U-shaped members which extend outwardly from the front face 22 and provide an opening 36 which is sized and arranged to closely receive the fingers 32. This provides an arrangement whereby a co-planar relationship of the front faces 16 and 22 is maintained while permitting the components to be slid laterally toward and away from one another. It should also be noted that it is preferable that the rear surfaces of the fingers 32 be provided at the distal end with an inclined guide surface 38 to facilitate joining of the fingers 32.

As will subsequently be described in somewhat more detailed, the relationship of the components as shown in FIGS. 2 to 4 is a preliminary, interengaged relationship which allows them to be moved to the mounting position on an associated panel to which they are to be connected. Associated with the interconnecting means 30 is a latch means comprising a resilient latch arm 40 that extends laterally from the rear face 18 of component 12. The resilient latch arm is, in the preferred embodiment, located generally centrally between the fingers 32. Carried on the end of the latch arm 40 is a detent or latch element 42 which extends forwardly from the front face of arm 40. The member 14 includes through openings or recesses 44 that are located in horizontal alignment with the latch arm 40 and its associated detent or latch element 42. Additionally, the size and shape of the openings 44 are such as to allow the element 42 to extend thereinto to provide a stop at either of the two positions defined by the openings 44. The first position defines the inter-relationship shown in FIG. 2 in which the components 12 and 14 are in their spaced position while the second or right-hand opening 44 defines the closely related and interengaged final position illustrated in FIG. 6. As can be appreciated, to allow movement of the latch arm 40 to a disconnected position for movement back and forth between the two recesses, it is merely necessary to push inwardly against the outer surface of the detent to deflect the arm rearwardly to a disengaged position.

The means for allowing the backplate assembly to be interconnected with an associated support panel comprise retaining legs 50 and 52 which extend respectively from the rear faces 18 and 24 of the plates 12 and 14. As best seen in FIGS. 3–6, the first plate member 12 preferably includes two of the legs 50 that extend generally perpendicularly therefrom and terminate in laterally extending hook ends 50a.

The retaining legs 52 are substantially identical to legs 50 and extend from the rear face 24 of the plate member 14 in spaced sets of two as seen in FIG. 4. The legs 52 terminate in laterally extending hook ends 52a which, in the preferred embodiment, extend directly toward the hook ends 50a of the associated plate member 12.

Figure 5:
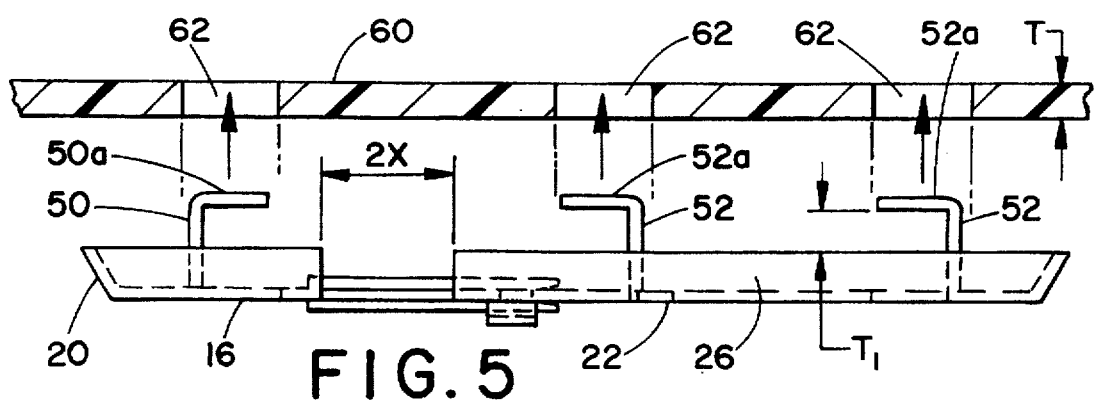
FIG. 5 is a top plan view showing the assembled components preparatory to being installed on a vehicle body panel such as a headliner; and, FIG. 6 is a top plan view showing the backplate assembly of the invention in an installed position on a vehicle body panel.

The distance which the retaining legs 50 extend from the associated plate member is dictated by the thickness of the panel to which the plate assembly is to be connected. In this regard, attention is directed to FIGS. 5 and 6 which are top views showing the plate assembly 10 as it is installed to an associated panel 60 which, for example, can be a headliner or other rigid or semi-rigid, internal vehicle panel. In this showing, the panel 60 has a thickness T and the retaining legs 52 extend outwardly such that the space $T_1$ between the inner face of the hook portions 52, 50a are substantially equal to this thickness T. Additionally, to allow installation of the assembly 10, the panel 60 is provided with openings sized and located as shown in FIG. 5. That is, suitable openings 62 are provided to have an exterior periphery which will allow the hook ends 50a, 52a to be closely received therethrough as generally depicted in FIG. 5. Additionally, sufficient openings are provided so as to allow all six of the retaining legs to be passed into and through the panel when the assembly is in its interconnected but spaced relationship shown in FIGS. 2, 3, and 5. After the legs are passed through the openings 62 and the panel flange portions 20, 26 brought into tight engagement with the forward surface of the panel 60, the components 12 and 14 can be moved laterally toward one another by releasing the detent 44 from the left-hand opening 44 to permit lateral sliding of the components relative to the fingers 32. When the components 12 and 14 are in their engaged position shown in FIG. 6, the laterally extending hook ends 50a, 52a are engaged behind the back surface of the panel 60 and the assembly is then tightly connected to the panel. At this time, the latch or detent element 42 enters the right-hand opening 44 and the components are firmly held together. The backplate assembly can then be used by having additional accessory elements connected thereto. In this regard, the backplate elements 12 and 14 can be provided with suitable fasteners, fastener receiving openings, or the like for allowing the accessory elements to be readily connected thereto. In the illustrated showing, there are additional openings 66 and 68 formed as best seen in FIGS. 1 and 2. These openings result from the tooling used in the injection molding dies to form the hook ends 50a and 52a. The openings could, however, be used with suitable fasteners for mounting accessory elements. Alternatively, other types of dies could be used to eliminate the openings 66, 68 and/or form other types of fastener receiving openings or integral fasteners.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A backplate assembly for attachment to a vehicle panel such as a headliner comprising:

first and second backplate members each having front and rear faces;

the first and second backplate members positioned in side-by-side relationship with their front faces facing in the same direction;

interconnecting means operable while the first and second backplate members are in said side-by-side position for permitting selective connected movement of the first and second backplate members from a first spaced position to a second closely adjacent position, said interconnecting means including latch means for releasably latching said first and second backplate members in at least one of said first and second positions; and, at least one retaining leg extending from the rear face of each of the first and second backplate members for permitting the backplate members to be connected to the panel when in one of said first and second positions.

2. The backplate assembly as defined in claim 1 wherein said retaining legs are each provided with a retaining hook.

3. The backplate assembly as defined in claim 1 wherein said retaining legs each include a retaining hook that extends generally toward the retaining leg on the other backplate member.

4. The backplate assembly as defined in claim 1 wherein said interconnecting means comprise at least one finger extending from one of said first and second backplate members toward the other of said first and second backplate members.

5. The backplate assembly as defined in claim 1 wherein said latch means includes means for releasably latching said first and second backplate members in either said first position or said second position.

6. The backplate assembly as defined in claim 5 wherein latch means includes a resilient latch arm extending from one of said first and second backplate members to the other of said first and second backplate members.

7. The backplate assembly as defined in claim 5 wherein said latch means includes at least one detent and openings for receiving said detent.

8. The backplate assembly as defined in claim 1 wherein the interconnecting means comprises at least one finger extending from one of said first and second backplate members through guide opening means in the other of the first and second backplate members.

9. The backplate assembly as defined in claim 8 wherein there are a plurality of said fingers.

10. A backplate assembly for attachment to a vehicle panel to provide a base for subsequent attachment of a vehicle accessory comprising:

first and second relatively rigid backplate members having oppositely disposed front and rear faces, said members positioned in side-by-side relationship with their front faces substantially co-planar;

interconnecting means extending between the first and second backplate members for guiding and constraining selective movement of said members laterally toward or away from one another between first and second spaced positions;

latch means for releasably maintaining said members in either said first position or said second positions; and, at least one retaining leg means extending from the rear face of each of said members to engage through openings in the vehicle panel to connected the members to the panel when the members are moved to the second position.

11. The backplate assembly as set forth in claim 10 wherein said interconnecting means include at least one finger extending from one of said members through a guide opening in the other of said members.

12. The backplate assembly as set forth in claim 10 wherein said latch means includes a resilient arm having at least one detent thereon.

* * * * *